US005797299A

United States Patent [19]
Long, Jr.

[11] Patent Number: 5,797,299
[45] Date of Patent: Aug. 25, 1998

[54] WIRE CUTTING AND STRIPPING MECHANISM

[75] Inventor: Alden Owen Long, Jr., Carlisle, Pa.

[73] Assignee: The Whitaker Corporation, Wilmington, Del.

[21] Appl. No.: 753,626

[22] Filed: Nov. 27, 1996

[51] Int. Cl.$^6$ ...................................................... H02G 1/12
[52] U.S. Cl. ............................................ 81/9.51; 29/564.4
[58] Field of Search ........................ 81/9.51; 29/564.4; 30/90.1

[56] References Cited

U.S. PATENT DOCUMENTS

| | | | |
|---|---|---|---|
| 4,528,741 | 7/1985 | Grimsby | 81/9.51 X |
| 4,577,405 | 3/1986 | Butler | 30/90.1 |
| 4,852,433 | 8/1989 | Butler | 81/9.51 |
| 4,972,582 | 11/1990 | Butler | 30/90.1 |
| 5,025,549 | 6/1991 | Hornung et al. | 81/9.51 X |
| 5,199,328 | 4/1993 | Hoffa | 81/9.51 |
| 5,414,931 | 5/1995 | Wollermann | 30/90.1 |
| 5,469,763 | 11/1995 | Hoffa | 81/9.51 |
| 5,526,717 | 6/1996 | Koch | 81/9.51 |

*Primary Examiner*—James G. Smith
*Attorney, Agent, or Firm*—Marshall E. Rosenberg

[57] ABSTRACT

A machine (10) is disclosed for processing an insulated wire (12), to sever the wire into a feed end (178) and an eject end (180), and to remove a selected portion of insulation from each of the ends. The machine (10) includes a wire cutting and stripping unit (22) including a left blade (64) having first and second spaced cutting edges (148, 154) associated therewith and a right blade (64') having third and fourth spaced cutting edges (148', 154') associated therewith. Additionally, a mechanism (60, 62, 126) is provided for moving the left and right blades (64, 64') in converging directions (170, 172) toward each other so that the first and third cutting edges (148, 148') effect the severing of the wire (12). After severing the wire, the left and right blades (64, 64') are further moved in the converging directions (170, 172) so that the first and fourth cutting edges (148, 154') move into insulation cutting engagement with the feed side end (178) and the second and third cutting edges (154, 148') move into insulation cutting engagement with the eject side end (180). As the two ends (178, 180) are withdrawn away from each other, the cut insulation slugs (194) are stripped off and collected by scrap collection tubes (186, 188).

20 Claims, 6 Drawing Sheets

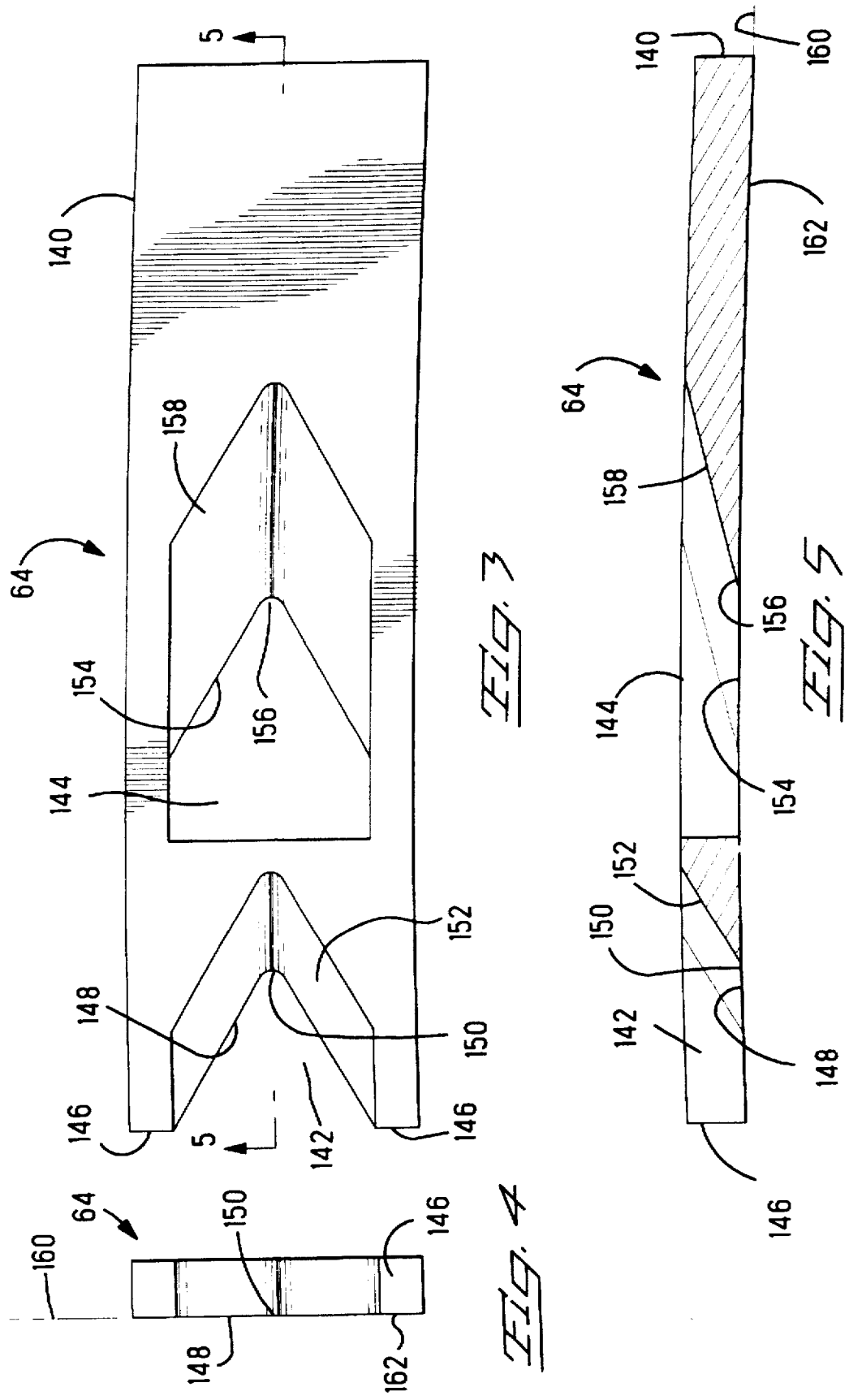

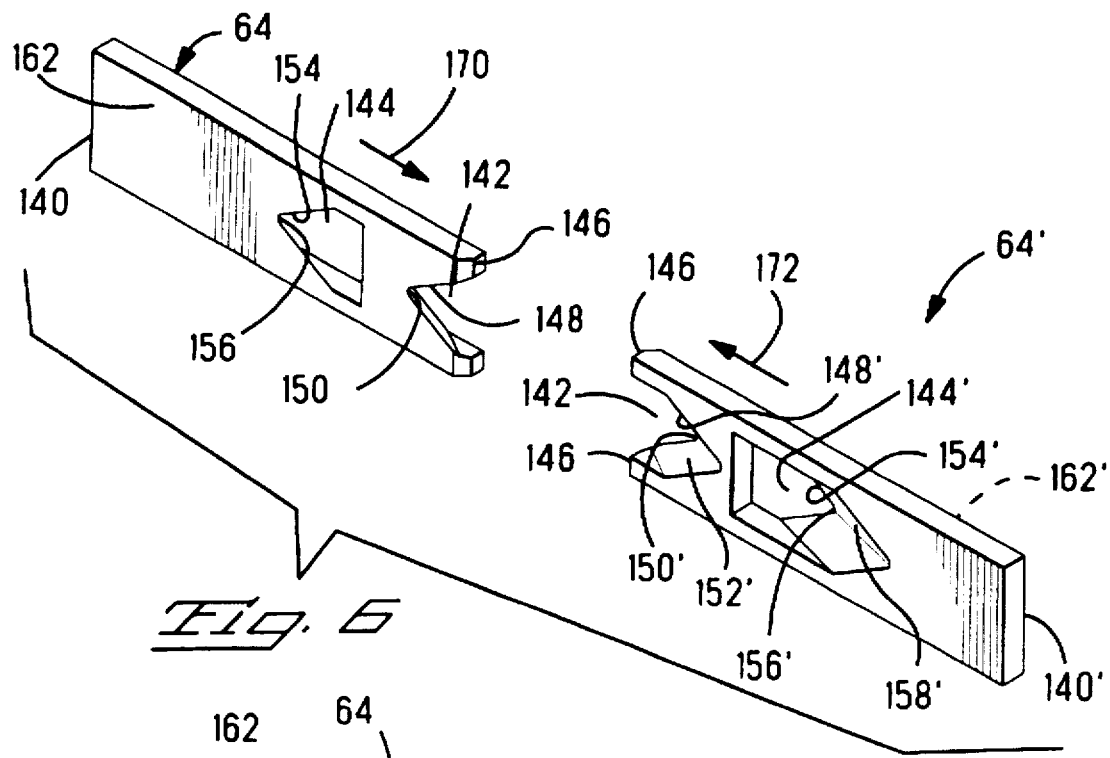
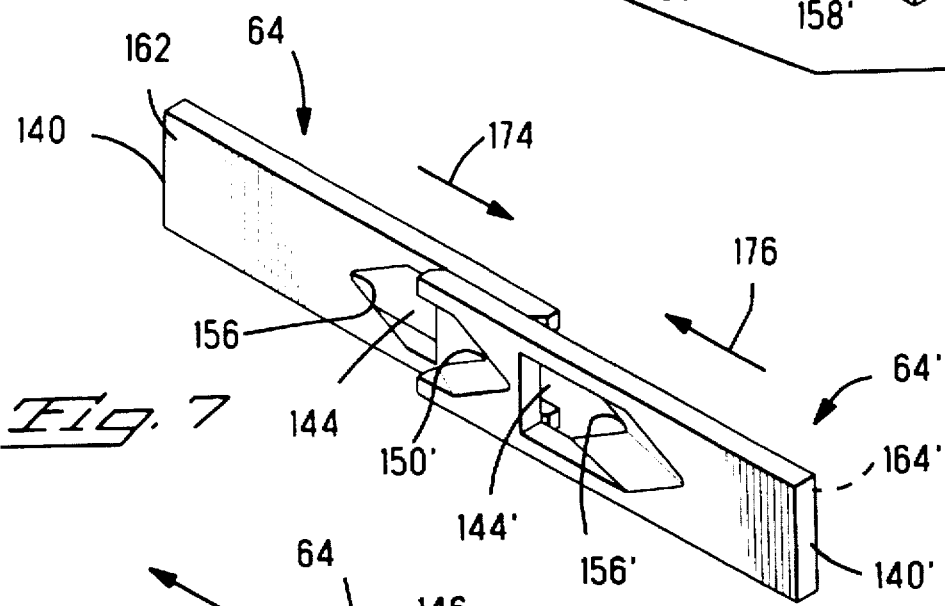
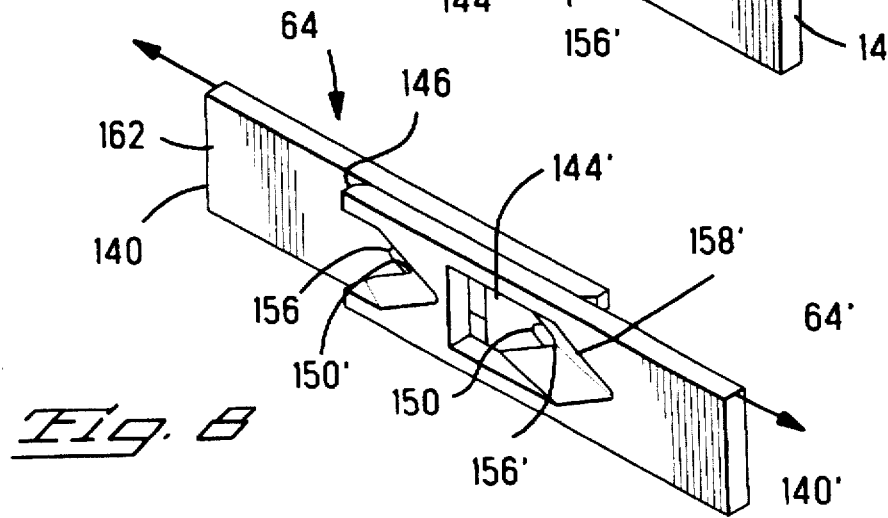

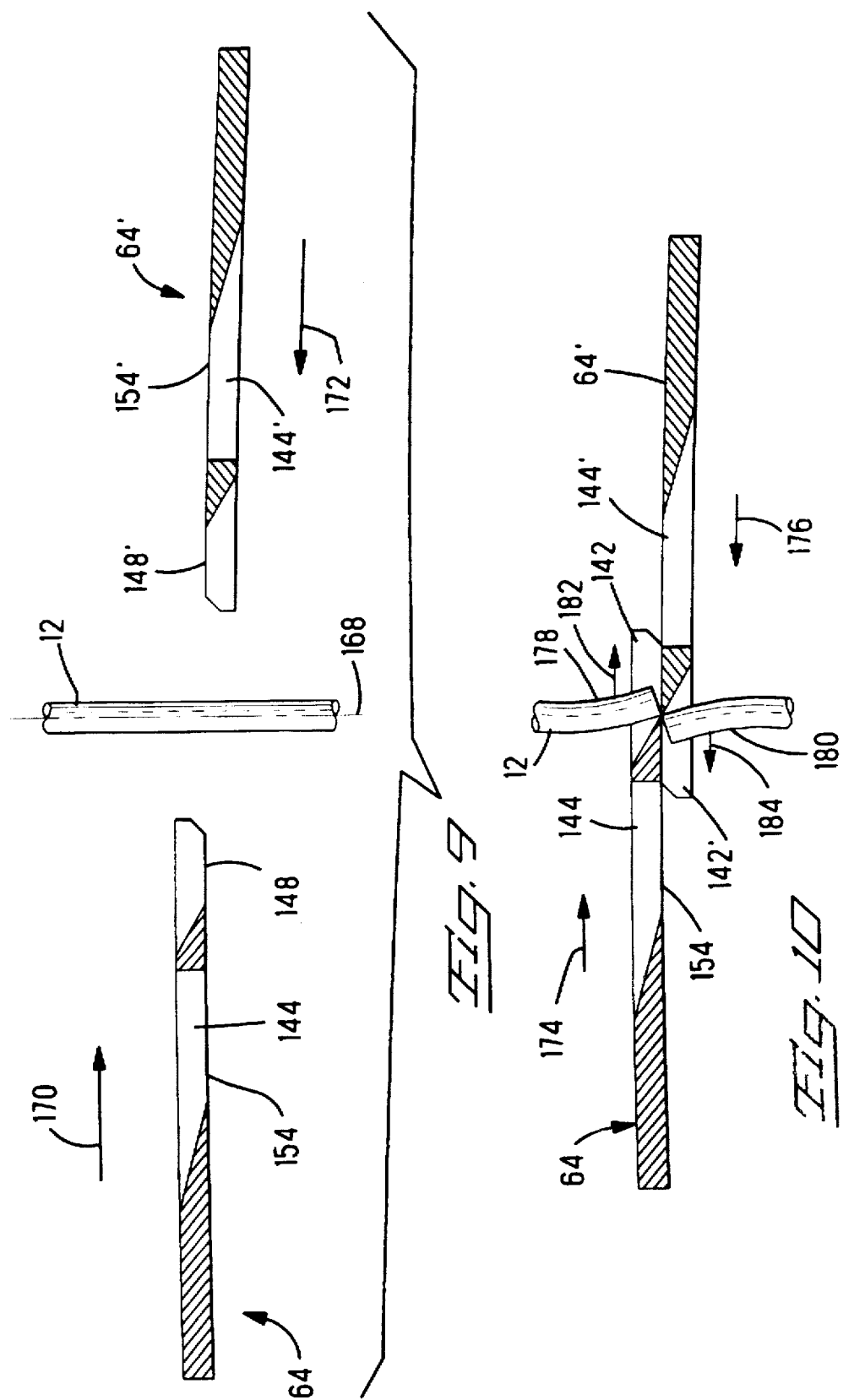

WIRE CUTTING AND STRIPPING MECHANISM

The present invention relates to wire processing machines and more particularly to an improved mechanism for cutting a wire to length and stripping the insulation from the cut ends.

BACKGROUND OF THE INVENTION

Machines that utilize electrical wire in the manufacture of a product typically draw lengths of wire from an endless source, such as a reel, and feed the drawn wire into mechanisms that operate on the wire in some way to produce the product. Sometimes the wire is cut to a specific length and it becomes the product, other times the wire is used to interconnect electrical components in a product. The former, for example, is made by a machine that is typically called a "lead maker" in the industry. These machines draw wire from an endless source, measure its length precisely, then cut it to a desired length. The ends may or may not be terminated to electrical terminals, or the ends may simply be prepared for termination. A wire cutting and stripping unit is provided having a set of cutting blades for cutting the wire and a separate set of stripping blades for stripping a desired length of insulation from the ends of the wire, as may be required. Usually, the wire cutting blades and the stripping blades are fixed in a common tool holder that is movable toward and away from the wire path. The cutting blades extend further outwardly so that as the tool holder is advanced toward the wire, the cutting blades engage and cut the wire followed immediately by the stripping blades engaging the wire and severing the insulation. The wire is then pulled axially away from the cutting and stripping unit so that the cut slug of insulation is stripped away from the wire. This arrangement requires that the stripping blades be spaced from the cutting blades a predetermined distance that corresponds to the desired length of the strip. When a wire requiring a different length of strip is processed, the spacing between the stripping blades and the cutting blades must be adjusted, usually by inserting or removing spacers. This requires that the machine by taken out of service while this is done. There is usually insufficient room between the cutting blades and the stripping blades to provide a scrap collection system, so the stripped slug is allowed to simply fall downwardly by gravity. This sometimes causes large amounts of scrap to accumulate in the machine that is difficult to remove and may cause a malfunction. To overcome the undesirable requirement of taking the machine out of service to change the length of strip, a mechanism has been used to advance the tool holder toward the wire in two distinct steps. In the first step the wire is severed and the advancement of the tool holder is momentarily stopped. The wire is then repositioned axially with respect to the stripping blades by the wire feed system. The mechanism then resumes moving the tool holder so that the stripping blades engage and sever the insulation at the desired place and, as above, the wire withdrawn axially to strip away the slug of insulation. This has the advantage that the strip length is controllable through automation so that wires having different strip length requirements can be processed by the lead maker in succession without stopping the machine for adjustment. While this structure is advantageous, an important drawback is that three pairs of cutting blades must be used, one pair for severing the wire and two other pairs positioned on opposite sides of the severing blades for cutting the insulation when stripping. This requires suitable mounting structures for the six blades that accurately position them and move them into engagement with the wire, resulting in a relatively expensive and complex mechanism. Additionally, the problem of scrap accumulation is not addressed.

What is needed is a simple and inexpensive wire cutting and stripping unit having a single pair of cutting blades that both sever the wire and then engage and cut the insulation preparatory to stripping. When the cut insulation is stripped from the cut ends of the wire, a scrap collection device should be adjacent the stripping blades to capture the stripped slug.

SUMMARY OF THE INVENTION

An apparatus is disclosed for processing an insulated wire, to sever the wire into a feed end and an eject end, and to remove a selected portion of insulation from at least one of the feed end and the eject end. The apparatus includes a wire cutting and stripping unit including a left blade having first and second spaced cutting edges associated therewith and a right blade having third and fourth spaced cutting edges associated therewith. Means is provided for moving the wire along a wire path between the left and right blades in a first direction and in a second opposite direction. Additionally, means is provided for moving the left and right blades in converging directions toward each other so that the second and third cutting edges effect the severing of the wire. After severing, the left and right blades are further moved in the converging directions so that the first and fourth cutting edges move into insulation cutting engagement with ether the feed side end or the eject side end or both.

DESCRIPTION OF THE FIGURES

FIGS. 3 and 4 are plan and end views of the wire cutting and stripping blades shown in FIG. 2;

FIG. 5 is a cross-sectional view taken along the lines 5—5 in FIG. 3;

FIGS. 6, 7, and 8 are isometric views of the cutting and stripping blades shown in FIG. 2, shown in various operational positions; and FIGS. 9 through 13 are schematic representations of the cutting and stripping blades shown in FIGS. 6, 7, and 8, illustrating the cutting and stripping action of the blades.

DESCRIPTION OF THE PREFERRED EMBODIMENT

Figure 1:
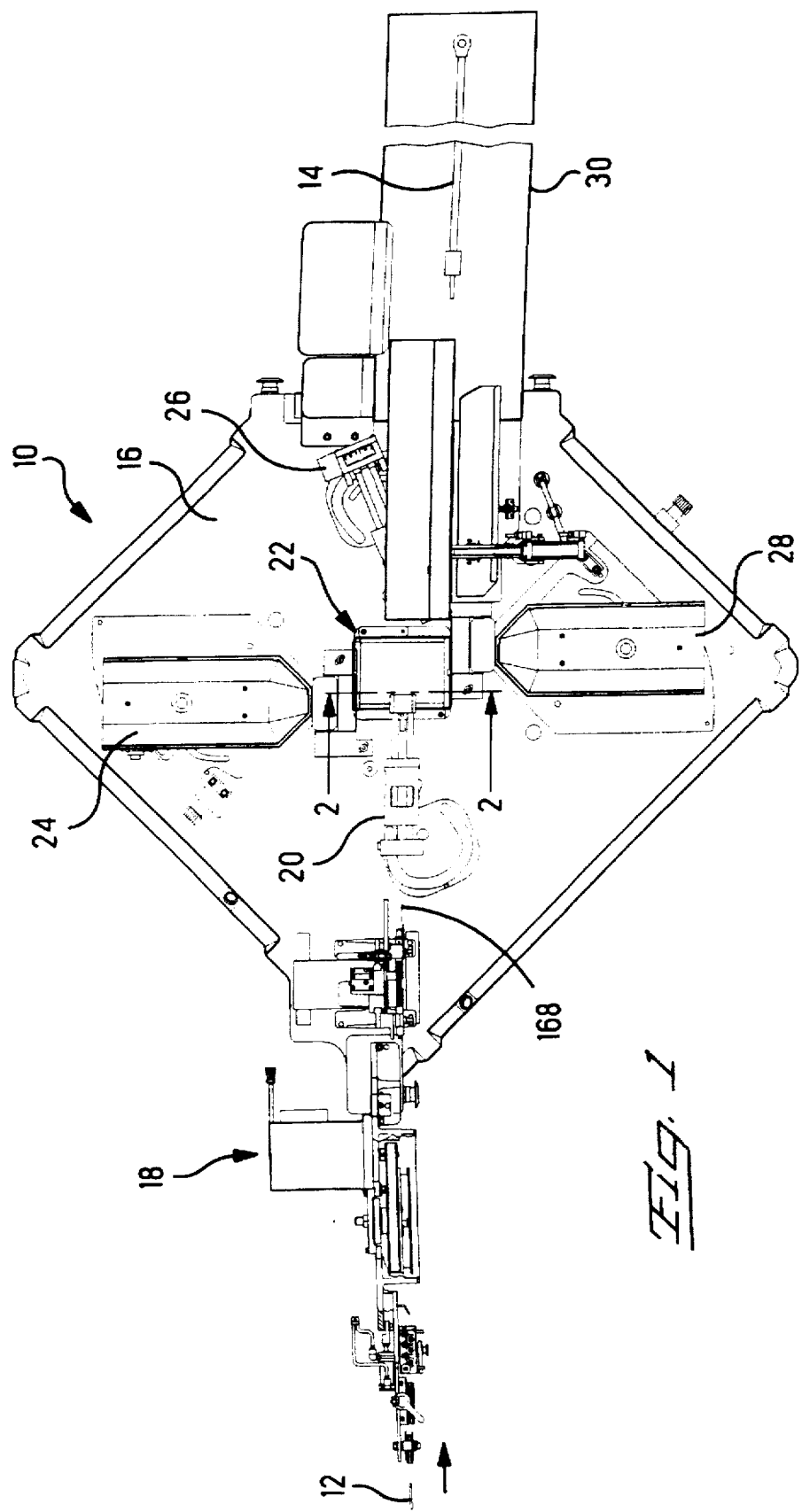
FIG. 1 is a top view of a wire processing machine having a wire cutting and stripping mechanism incorporating the teachings of the present invention.

There is shown in FIG. 1 a wire processing machine 10 for receiving a continuous length of wire 12 in the making of electrical leads 14. The machine 10 includes a frame 16 and a wire inlet assembly 18 attached to the frame which straightens the wire and feeds it into the processing portion of the machine. A feed side wire transfer unit 20 is arranged to position the wire with respect to a wire cutting and stripping unit 22 for cutting the lead 14 to length and for stripping the insulation from the cut ends of the wire 12 and lead 14, as desired. Additionally, the feed side transfer unit 20 will position the cut end of the wire 12 in terminating tooling held by a feed side terminating unit 24 for attachment of a terminal, if required. The partially completed lead 14 is then received by an eject side transfer unit 26 which positions the end of the lead in terminating tooling held by an eject side terminating unit 28 for attachment of a terminal, if required. The completed lead is then ejected into a stacking tray 30, as shown in FIG. 1.

Figure 2:
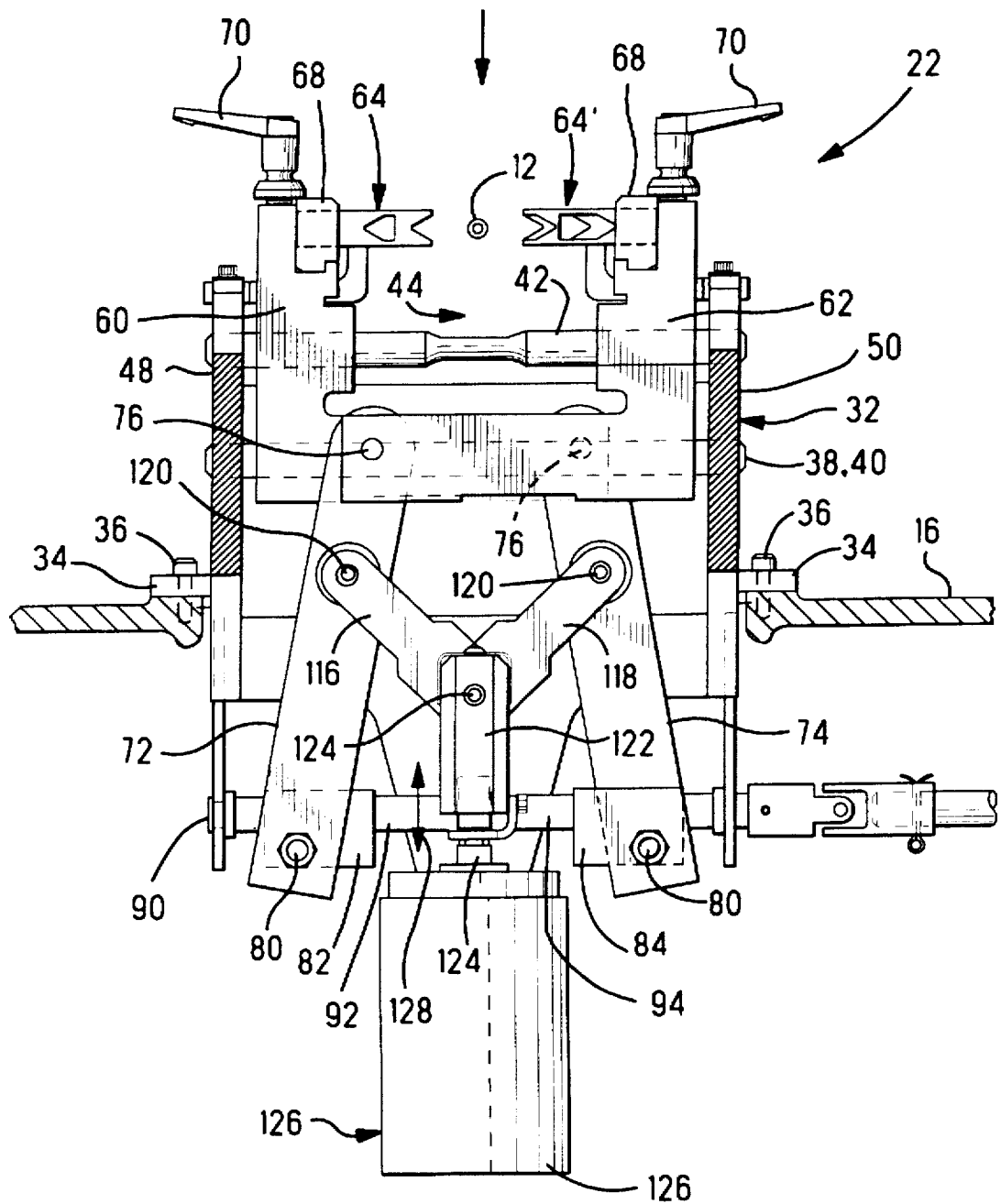
FIG. 2 is a cross-sectional view taken along the lines 2—2 in FIG. 1, showing the blade actuating mechanism in a fully open position.
Figure 11:
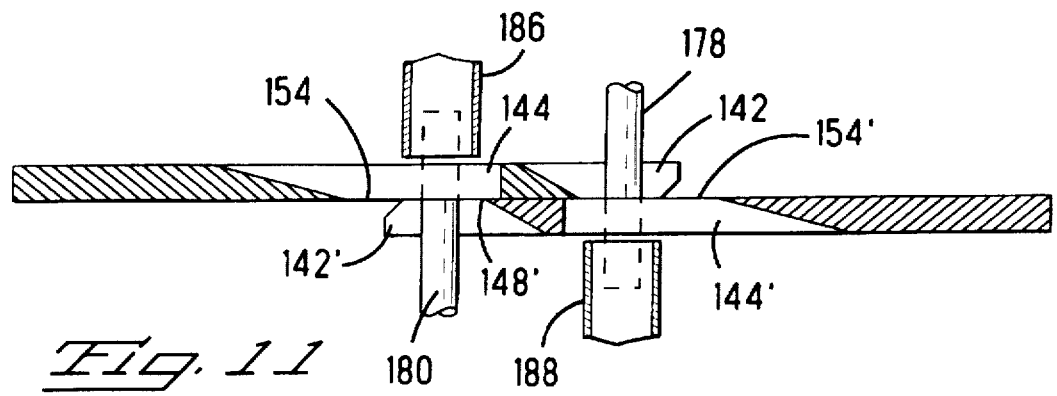

The wire cutting and stripping unit 22, as shown in FIG. 2, includes a cast housing 32 having a pair of mounting flanges 34 on opposite sides which are secured to the frame 16 by means of screws 36 extending through clearance holes in the flanges and into threaded holes in the frame. Three parallel rails 38, 40, and 42 are disposed within a cavity 44 of the housing 32, their ends held in bores formed through the left and right side walls 48 and 50, respectively. Left and right tool holders 60 and 62, respectively, are slidingly coupled to the rails 38, 40, and 42 by means of linear ball bushings that are disposed in bores in the tool holders. As best seen in FIG. 2, left and right wire cutting and stripping blades 64 and 64', respectively, are secured in nests 68 in the tool holders 60 and 62 by means of two manually operable clamps 70. Left and right drive links 72 and 74 are arranged within the cavity 44, each upper end being pivotally attached at 76 to a respective right and left tool holder 62 and 60. The opposite ends of the two drive links 72 and 74 are similarly pivotally attached at 80 to left and right support blocks 82 and 84. The left support block has a left hand threaded bore formed therethrough and the right support block has a right hand threaded bore formed therethrough, both of which are in threaded engagement with an adjusting screw 90 having left and right hand threaded portions 92 and 94. The purpose of the adjusting screw 90 is to selective and precisely position the cutting and stripping blades by adjusting the distance between the two pivotal attachments 80. When this distance is reduced the cutting and stripping blades cut more deeply into the insulation of the wire 12. When this distance is increased the cutting and stripping blades cut less deeply. A pair of left and right toggle links 116 and 118, respectively, have their free ends pivotally attached to the two drive links at 120 intermediate each drive link's two ends. The two toggle links 116 and 118 are pivotally attached at their coupled ends to a clevis 122 that is threaded onto an end of a movable armature of a linear actuator, such as a piston rod 124 of a precision cylinder 126, slide mechanism operated by a stepper motor, or similar device that is capable of moving the clevis 122 in the vertical direction, as indicated by the arrow 128 in FIG. 2, a very precise amount.

The left and right wire cutting and stripping blades 64 and 64' are identical, therefore, only the blade 64 shown in FIGS. 3, 4, and 5, will be described. The cutting and stripping blade 64 includes an elongated body 140 having a first opening 142 and a second opening 144 formed therethrough, the first opening extending to an end 146 of the body 140. A V-shaped first cutting edge 148 is formed in a wall of the first opening 142 opposite the end 146, as best seen in FIGS. 3 and 5. The cutting edge 148 converges to a vertex 150 and includes a raked surface 152 so that the first cutting edge 148 is very sharp. A V-shaped second cutting edge 154 is formed in a wall of the second opening 144 opposite the end 146 and converges to a vertex 156 and includes a raked surface 158 so that the second cutting edge is very sharp. The first and second cutting edges 148 and 154 define a plane 160 that is coplanar with a flat surface 162 of the body 140.

The left and right wire cutting and stripping blades 64 and 64' are shown in FIGS. 6, 7, and 8 in various operating positions, wherein features of the left blade 64 have identifying numbers without primes and like features of the right blade 64' have the same identifying numbers with primes. As shown in FIG. 6, the left and right blades 64 and 64' are separated a maximum amount and are in their open position,
as shown in FIG. 2. The left and right blades 64 and 64' are positioned in the left and right tool holders 60 and 62 so that when the tool holders are moved toward each other, thereby moving the left and right blades in the directions of the arrows 170 and 172, the two surfaces 162 and 162' mutually engage and slide against each other so that the cutting edges 148, 154, 148', and 154' are all substantially coplanar. As movement of the two blades 64 and 64' continues, the two cutting edges 148 and 148' converge and pass each other, as shown in FIG. 7, so that any wire disposed therebetween is severed. As movement continues in the converging direction, as indicated by the arrows 174 and 176 in FIG. 7, the pairs of cutting edges 148 and 154', and 148' and 154 converge to their most engaged position, or fully closed position, as shown in FIG. 8, where the two pairs of opposing cutting surfaces are spaced to sever the insulation of the wire without nicking the conductor.

Figure 12:
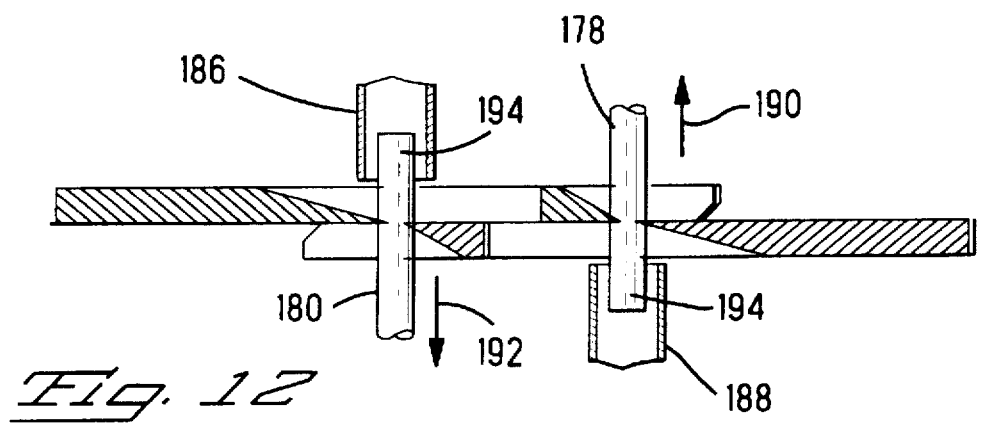
Figure 13:
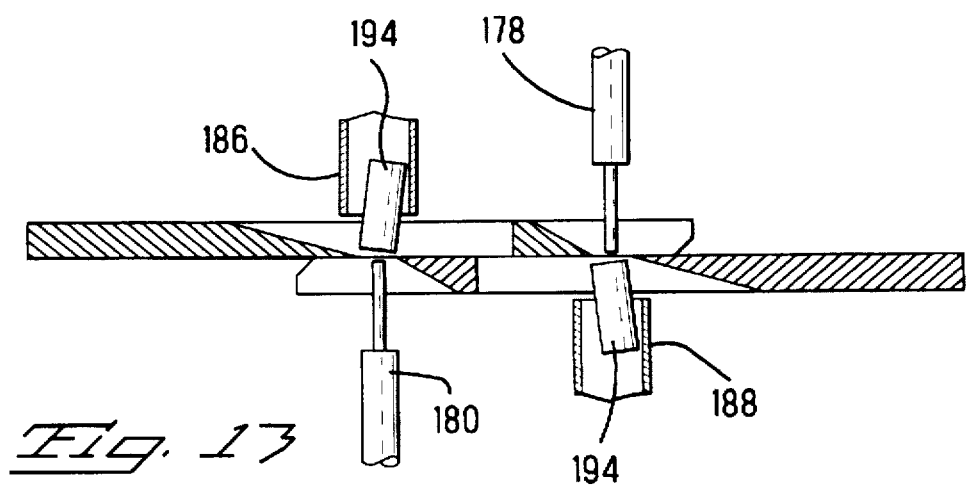

The operation of the wire cutting and stripping unit 22 will now be described with reference to FIGS. 2 and 6 through 13, where FIGS. 9 through 13 schematically represent the left and right cutting blades 64 and 64' during the various stages of operation. During this description of the operation the cutting edges 148 and 154 of the left blade 64 will be referred to as the first and second cutting edges and the cutting edges 148' and 154' of the right blade 64' will be referred to as the third and fourth cutting edges. With the left and right cutting blades 64 and 64' in their open position, as shown in FIG. 2, the feed side transfer unit 20 feeds a desired length of the wire 12 axially through the cutting and stripping unit 22 along a wire path 168, shown in FIGS. 1 and 9. The cylinder 126 is then operated to extend the piston rod 124, upwardly as viewed in FIG. 2, so that the clevis 122 moves upwardly so that the left and right toggle links 116 and 118 begin to straighten thereby forcing the left and right drive links 72 and 74 apart. As the left and right drive links 72 and 74 move apart they pivot about the pivotal attachments 80 associated with the left and right support blocks 82 and 84 while their upper ends move the left and right tool holders 60 and 62 toward each other so that the left and right wire cutting and stripping blades 64 and 64' begin to close on the wire 12 in converging directions indicated by the arrows 170 and 172 in FIGS. 6 and 9. This movement continues as the first cutting edge 148 of the left blade meets the third cutting edge 148' of the right blade, as shown in FIGS. 7 and 10, and severs the wire thereby forming a feed side end 178 and an eject side end 180. Immediately after severing the wire the feed side transfer and the eject side transfer move the two severed ends in the directions of the arrows 182 and 184 to the positions shown in FIG. 11 where the ends are opposite the first and second openings 144 and 144'. Extension of the piston arm 124 momentarily stops so that the left and right blades 64 and 64' stop in the position shown in FIG. 11. At this point the feed side transfer 20 feeds the feed side end 178 a desired distance through the opening 144', as shown in phantom lines in FIG. 11, and the eject side transfer feeds the eject side end 180 a desired distance through the opening 144, as shown in phantom lines. The feed side and eject side ends extend through their respective openings and into scrap collection tubes 186 and 188, respectively, that are associated with the left and right blades and move therewith. The distance that the two cut ends are moved through their respective openings corresponds to the length of insulation that is to be stripped from the ends. When the two cut ends are properly positioned, upward movement, as viewed in FIG. 2, of the piston rod 124 resumes thereby further moving the left and right blades 64 and 64' to their closed positions, as shown in FIGS. 8 and 12.

As the left and right blades move into these positions the second cutting edge 154 and the third cutting edge 148' engage and sever the insulation of the eject side end 180 and the first cutting edge 148 and the fourth cutting edge 154' engage and sever the insulation of the feed side end 178 without contacting the underlying conductors, as shown in FIG. 12. At this point there is a pause in movement of the cutting and stripping blades, their relative positions being shown in FIGS. 8 and 12, while the feed side transfer unit 20 retracts the feed side end 178 and the eject side transfer unit 26 retracts the eject side end 180 in the direction of the arrows 190 and 192, respectively, as shown in FIG. 12. This movement of the feed and eject side ends serves to strip the severed slugs 194 of insulation from their ends, whereupon the slugs are picked up by a suction in the tubes 186 and 188 and delivered to a scrap collection system for disposal. The piston arm 124 is then retracted by the cylinder 126 so that the wire cutting and stripping blades move to their open position shown in FIG. 2. The eject side transfer unit 26 then processes the wire having the eject side end 180, in the usual manner, and the wire 12 is again advanced into the wire cutting and stripping unit 22 and the process repeated, as desired.

While the present invention has been describe with reference to a specific structure, variations in this structure may be made which fall within the scope of the teachings of the present invention. Such variations may include means for moving the severed ends 178 and 180 in the directions of the arrows 182 and 184, respectively, as shown in FIG. 10, other than the feed side and eject side transfer units 20 and 22. Such a means may include a spring loaded member that is carried by each of the left and right cutting and stripping blades 64 and 64' that urges the cut end in the proper direction as the blades continue to move to their positions shown in FIG. 11, where movement of the blades is momentarily suspended until the ends 178 and 180 can be fed through their respective openings 142 and 144 for stripping. Furthermore, assuming that the openings 142 and 144 are large enough, the timing of the operations of the machine 10 may be controllable to allow the feeding of the ends 178 and 180 through their respective openings 142 and 144 without momentarily stopping the movement of the blades 64 and 64'. Additionally, the scrap collection tubes 186 and 188 may either be attached to and carried by their respective blade 64 and 64' or other movable mechanism, or they may be stationary with respect to the cutting and stripping unit 22 but have openings suitably shaped to receive the ends 178 and 189 as they are being fed axially through the openings 142 and 144 while the blades continue their movement in the direction of the arrows 174 and 176. While the above illustrate suitable alternative structures, these structures are by way of example only and it will be understood that other similar alternative structures may be utilized in the practice of the present invention. While the above described wire cutting and stripping unit 22 includes a toggle driven linkage mechanism powered by a linear actuator to move the left and right wire cutting and stripping blades, it will be understood that other actuating mechanisms may be advantageously utilized in the practice of the present invention. Further, it will be understood that the actuating mechanism for moving the left and right wire cutting and stripping blades into wire severing engagement may be a different mechanism than that utilized to further move the blades into insulation cutting engagement.

An important advantage of the present invention is that the feed end and eject end of the severed wire can be positioned for any desired strip length, wherein the strip length is controllable through automation so that wires having different strip length requirements can be processed by the lead maker in succession without stopping the machine for adjustment. Another important advantage is that a simplified and inexpensive mounting structure can be used to support and position the left and right cutting and stripping blades, where the prior art must accommodate six blades. Further, with the present structure, scrap collection tubes can be easily associated with the left and right blades to efficiently collect the scrap slugs of insulation that are stripped from the wire ends.

I claim:

1. In an apparatus for processing an insulated wire, to sever said wire into a feed end and an eject end, and to remove a selected portion of insulation from at least one of said feed end and said eject end, the combination comprising:

(1) a wire cutting and stripping unit including a left blade having first and second spaced cutting edges associated therewith and a right blade having third and fourth spaced cutting edges associated therewith;

(2) means for moving said wire along a wire path between said left and right blades in a first direction and in a second opposite direction;

(3) means for moving said left and right blades in converging directions toward each other so that said first and third cutting edges effect said severing of said wire;

(4) means for further moving said left and right blades in said converging directions so that said second and third cutting edges move into insulation cutting engagement with said eject end.

2. The combination according to claim 1 wherein upon said further moving of said left and right blades said first and fourth cutting edges move into insulating cutting engagement with said feed end and when said means for moving said wire effects said movement thereof said stripping of said insulation from said feed end and said eject end is effected thereby producing scrap slugs of stripped insulation.

3. The combination according to claim 1 wherein said left blade includes an opening extending from said second cutting edge and said right blade includes another opening extending from said fourth cutting edge, said opening and said another opening arranged so that after said severing of said wire and before said first and fourth cutting edges come into said insulation cutting engagement, said eject end is moveable into said opening a selected distance and said feed end is moveable into said another opening a selected distance.

4. The combination according to claim 3 wherein said means for further moving said left and right blades is arranged to move said blades in said converging directions until said third cutting edge is adjacent said opening and spaced from said second cutting edge, then to momentarily stop said further movement until said feed end and said eject end are moved said selected distances.

5. The combination according to claim 1 wherein said first and second cutting edges are integral to said left blade, said left blade being of unitary construction and wherein said third and fourth cutting edges are integral to said right blade, said right blade being of unitary construction.

6. The combination according to claim 1 wherein said first cutting edge and said second cutting edge are in a first plane and said third cutting edge and said fourth cutting edge are in a second plane.

7. The combination according to claim 6 wherein said first and second planes are substantially coplanar.

8. The combination according to claim 2 including a left scrap collection member associated with said left blade adjacent said opening and a right scrap collection member associated with said right blade adjacent said another opening, said left and right scrap collection members arranged to capture said stripped slugs of insulation.

9. A wire cutting and stripping mechanism for severing a wire having an outer insulating layer and for severing and removing a portion of said outer layer comprising: a frame, first and second opposed cutting blades on opposite sides of a wire path, said first blade having first and second spaced cutting edges that define a first plane and said second blade having third and fourth spaced cutting edges that define a second plane, said first and second cutting blades being coupled to said frame and including means arranged to move said first and second blades toward said wire path in first and second discrete amounts of movements, separable by a pause in movement, said first and second blades arranged so that during said first amount of movement said first and third cutting edges sever said wire into a feed end and an eject end, during said pause in movement said feed end is moved through said first and second planes a selected distance and said eject end is moved through said first and second planes another selected distance, and during said second amount of movement said second and third cutting edges engage and sever said outer layer of said eject end and said first and fourth cutting edges engage and sever said outer layer of said feed end.

10. The mechanism according to claim 9 including means for moving said feed end and said eject end in opposite directions away from each other along their respective axes after said first and second blades are moved said second amount of movement.

11. The mechanism according to claim 9 wherein said first blade includes an opening extending from said second cutting edge and said second blade includes another opening extending from said fourth cutting edge, said opening and said another opening arranged so that during said pause in movement of said first and second blades said elect end is moved into said opening said selected distance and said feed end is moved into said another opening said another selected distance.

12. The mechanism according to claim 11 wherein said means for moving said first and second blades is arranged to move said blades toward said wire path until said third cutting edge is adjacent said opening and spaced from said second cutting edge, then to momentarily stop said movement until at least one of said feed end and said eject end are moved said selected distance and said another selected distance, respectively.

13. The mechanism according to claim 9 wherein said first and second cutting edges are integral to said first blade, said first blade being of unitary construction and wherein said third and fourth cutting edges are integral to said second blade, said second blade being of unitary construction.

14. The combination according to claim 13 wherein said first and second planes are substantially coplanar.

15. In a method of processing a wire having an insulated outer layer by means of a wire processing apparatus including a wire cutting and stripping unit having a left blade having first and second spaced cutting edges associated therewith and a right blade having third and fourth spaced cutting edges associated therewith, said first and second cutting edges being in a first plane and said third and fourth cutting edges being in a second plane, the method comprising the steps:

(1) moving said wire along said wire path to a desired position between said left and right blades;

(2) moving said left and right blades in converging directions until said first and third cutting edges sever said wire into a feed end and an eject end;

(3) moving said feed end of said wire between said first and fourth cutting edges through said first and second planes a selected distance;

(4) moving said eject end of said wire between said second and third cutting edges through said first and second planes another selected distance;

(5) further moving said first and second blades in said converging directions until said first and fourth cutting edges and said second and third cutting edges cut said insulated outer layer of both said feed end and said eject end; then (6) moving said feed end and said eject end axially away from each other, thereby stripping said cut insulated outer layers therefrom.

16. The method according to claim 15 performing steps (3) and (4) only when said first and third cutting edges are adjacent to but spaced from said fourth and second cutting edges, respectively.

17. The method according to claim 16 including momentarily stopping said movement of said first and second blades during the performing of steps (3) and (4).

18. The method according to claim 15 wherein steps (3) and (4) are performed substantially concurrently.

19. The method according to claim 15 including after step (6), collecting some of said cut insulated outer layers by means of a scrap collection tube associated with one of said left and right blades.

20. The method according to claim 15 wherein said wire cutting and stripping unit includes a left scrap collection member associated with said left blade adjacent an opening in said left blade and a right scrap collection member associated with said right blade adjacent another opening in said right blade, and wherein after step 6:

capture said cut insulated outer layers in said left and right scrap collection members.

\* \* \* \* \*